June 14, 1960
V. SUSSIN
2,941,055
PRESSURE SWITCH
Filed Jan. 28, 1955
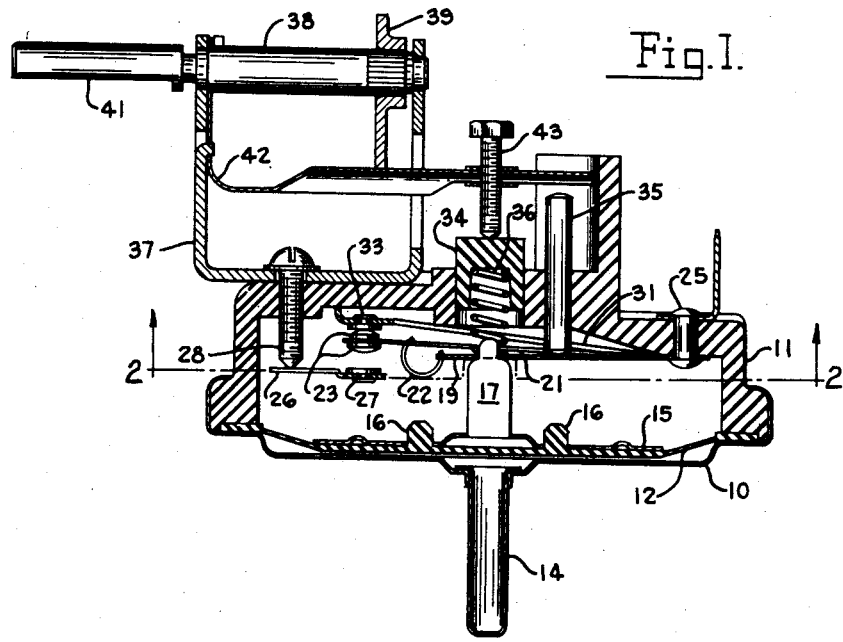
Fig.1.
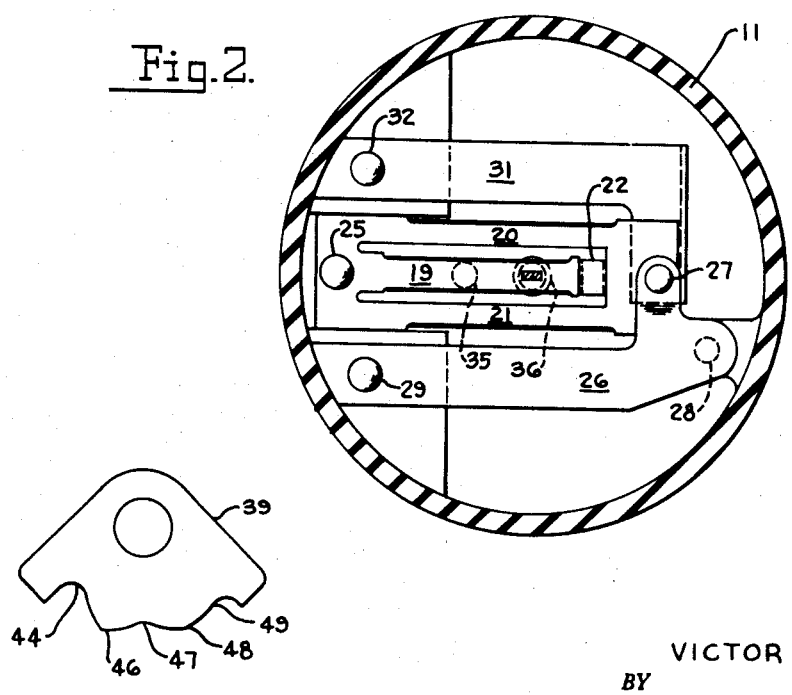
Fig.2.
Fig.3.
INVENTOR.
VICTOR SUSSIN
BY
Maurice A. Weikart
ATTORNEY

United States Patent Office 2,941,055
Patented June 14, 1960

2,941,055

PRESSURE SWITCH

Victor Sussin, River Forest, Ill., assignor, by mesne assignments, to General Controls Co., Glendale, Calif., a corporation of California Filed Jan. 28, 1955, Ser. No. 484,684

3 Claims. (Cl. 200—83)

This present invention relates generally to pressure switches of the type used to regulate the water level in domestic automatic washing machines, and in particular relates to a pressure switch in which the control point is adjustable and means are provided to reset the switch each time the control point is adjusted.

Control of the water level, in the operating cycle of automatic washing machines can be accomplished by use of a pressure switch, responding to the pressure head of the water in the washing machine. In these devices when the water level has reached the required height, the switch contacts are tripped open, stopping flow of water into the machine. Particularly in domestic automatic washing machines, it becomes advantageous to provide a pressure switch for this purpose in which the control point is adjustable. Thus, in the case where only a small load is to be washed, to avoid use of an unnecessarily large quantity of hot water, the water level in the machine may be considerably lower than that required when the machine is loaded normally. One suitable arrangement providing a water level adjustment has the pressure switch manually settable in either a low, medium, or high water level position.

In pressure switches of this type the water level adjustments may be accomplished by varying the spring loading on the pressure responsive element or diaphragm, the high level setting corresponding to the maximum spring loading of the diaphragm. Arrangement must also be made for adjusting, or calibrating the water lever or pressure at which the pressure switch is reset as water is withdrawn from the machine. This reset valve of course, is independent of the water level adjustment since, no matter to what level the machine has been filled, it must always be emptied before the subsequent spin-drying portion of the washing cycle is begun.

With the manual water level adjustment set at "low" position and with the tub filled to the correspondingly proper level and the switch in tripped position, if it is desired to change the water level to a higher value, the "medium" setting for example, provision must be made for resetting the switch back to its reset position. Since water can be admitted to the machine only when the switch is in reset position, and since the additional load increment placed on the diaphragm by changing the level adjustment from, for example, "low" position to "medium" position is insufficient, itself, to return the switch to reset position, a resetting mechanism is necessary. This resetting function may be accomplished by mechanically actuating the switch to its reset position each time the water level adjustment is changed.

A principal object of the present invention is to provide a pressure switch, of the type above described, having provision for manual water level adjustment and an arrangement for resetting the switch upon each water level adjustment which can be accomplished by a manual operator having only limited rotational freedom.

A further object is to provide a rugged and simply constructed pressure switch in which the trip point and the reset point may be independently adjusted.

These and other objects of the present invention can be more fully explained by reference to the accompanying specification in which:

Figure 1 represents a side view, partially in section, of the pressure switch.

Figure 2 is a sectional view taken substantially on the line 2—2 of Figure 1.

Figure 3 is an end view of the adjusting cam.

Referring principally to Figure 1, a base 10 and a cup-shaped housing or cover member 11 form a switch enclosure. A flexible diaphragm 12 overlies the base 10 and forms a pressure chamber beneath the diaphragm 12. The base 10 is provided with a pressure inlet connection 14. A plate 15 overlies the central portion of the diaphragm and is positioned thereon by protrusions 16 which are formed from the diaphragm 12 and extend through appropriate openings in the plate 15. A thrust member 17, in the form of a tongue struck from plate 15, extends upwardly from plate 15.

Member 17 is adapted to abut the switch actuating arm which is central compression member 19 of a conventional snap-switch assembly, having tension members 20 and 21, a C-shaped compression spring 22, and a moveable contact 23 mounted at the free end of the snap switch assembly. The other end of the switch assembly is mounted on member 11 by means of a rivet 25, the adjacent area of member 19 forming the effective pivot for member 19. A lower arm 26 carries a fixed contact 27 adapted to cooperate with moveable contact 23. An adjusting screw 28 is threaded through member 11 and its inner end bears against, and positions, the free end of arm 26, the other end of arm 26 being secured to member 11 by means of a rivet 29 (Figure 2). An upper contact arm 31 is also secured to member 11 by a rivet 32 (Figure 2) and has its free end upturned to bear against the cover member 11. Arm 31 carries, adjacent its free end, a fixed contact 33, adapted to cooperate with moveable contact 23.

At its upper, central portion cover member 11 has an opening within which a spring retainer member 34 is slidably received. A compression spring 36, a loading spring, extends between member 34 and compression member 19. A reset member or pin 35 extends freely through member 11 and has one end resting on member 19 at a point on member 19 somewhat closer to its fixed mounting (rivet 25) than is spring 36.

A generally U-shaped bracket 37 is rigidly mounted, by any suitable means, on the top of cover member 11. An adjusting shaft 38 is journaled in the legs of bracket 37, and carries at one end a cam 39, rigidly secured to shaft 38. A portion of shaft 38, at the end opposite cam 39, is flattened, as at 41 to receive an adjusting knob (not shown). An L-shaped adjusting lever or cam follower member 42 is rigidly fastened, by any suitable means, to one leg of bracket 37 and extends freely through an opening in the opposite leg and into overlying relation to the spring retainer 34 and pin 35, the effective pivot for member 42 being located adjacent its point of jointure with bracket 37. An abutment in the form of an adjusting screw 43 is threaded through lever 42 and bears against retainer 34. The horizontal section of lever 42 is channel shaped to add rigidity to this portion of its length.

Referring to Figure 3, cam 39 has an angular working surface of 45° which is divided into a depression 44, a lobe 46, a depression 47, a lobe 48, and a depression 49. Depressions 44, 47, and 49 have been identified in the order of their depth.

Operation

With the parts in the position shown in Figure 1, contacts 23 and 33 are closed and, assuming cam 39 is in its low water level position, i.e., that lever 42 is in contact with the depression 44 on cam 39, retainer 34 will be in its uppermost position and the minimum spring load (from spring 36) will be applied to member 17. As the pressure beneath diaphragm 12 increases, the upward force exerted by member 17 on the switch member 19 will eventually reach a value sufficient to overcome the downward force exerted by spring 36, and will move member 19 through the plane of the tension members 20 and 21. Moveable contact 23 will thereupon be snapped from its position in which contacts 23 and 33 are closed to its position at which contacts 23 and 27 are closed. In the washing machine cycle this snap-over of the switch contact 23 indicates that the washing machine has been filled with water to the low level corresponding to the setting of cam 39 and the water inlet valve has been closed.

If it subsequently appears that the low level setting of cam 39 does not give the optimum water depth for the particular loading of the machine, the water level in the machine may be increased by moving cam 39 to its medium water level position, the position in which lever 42 rests in depression 47. This will establish retainer 34 in a slightly lower position than its position in Figure 1 and will consequently provide a slightly greater spring load on diaphragm 12 permitting the water in the machine to rise to the higher level corresponding to the medium water level setting of cam 39.

The small increase in spring load on diaphragm 12, represented by the difference in depth of the depressions 44 and 47 on cam 39, is, of course, insufficient to move the snap switch from its position in which contacts 23 and 27 are closed (the position of the switch just prior to moving cam 39 from its low water level position to its medium water level position) to the position in which contacts 23 and 33 are closed (the position necessary to reopen the water inlet valve of the washing machine). This resetting of the switch as the water level adjusting cam is moved from one position to another is accomplished by lobes 46 and 48 on cam 39. As cam 39 is moved, between low and medium water level position for example, the lobe 46 depresses lever 42 momentarily, this downward movement of lever 42 being sufficient to cause its free end to contact the pin 35 and move it downwardly a sufficient distance to reset the switch. It will be understood that the lobe 48 similarly resets the switch as cam 39 is moved between medium and high water level positions.

In prior art devices this resetting action has been obtained by means of an exaggerated downward movement of the loading spring retainer to provide a resetting force through the loading spring, this downward movement being provided by the lobes on the adjusting cam comparable to lobes 46 and 48 on cam 39. Because, conventionally, only a 45° freedom of rotation of shaft 38 is available, and because a relatively large downward motion of the load spring retainer is necessary to reset the switch by this means, the lobes, comparable to lobes 46 and 48, on prior art pressure switches have necessarily been tall and their angle of attack on the adjusting cam correspondingly steep. The difficulties in providing for easy manual adjustment of the cam and a rigid adjustment structure under these conditions are obvious.

In the present invention, because the reset pin 35 is positioned relatively close to the fixed end of the snap switch structure, less motion is required to reset the switch than would be the case if the resetting effort were applied, as is conventional, at the loading spring. Additionally, the upper end of reset pin 35 is contacted by follower 42 adjacent its free end, where for a given cam lobe height the maximum motion is available. Because this construction minimizes the resetting motion necessary to reset the switch, lobes 46 and 48 on cam 39 may be relatively short with a correspondingly less steep angle of attack on cam 39. The pressure switch embodying the present invention thus provides an adjusting arrangement which can be easily and smoothly operated, and in which the adjustment structure need not be capable of resisting the relatively large deforming forces provided by the steep adjusting cam lobes of conventional pressure switches of this type.

Modifications of the present invention may occur to those skilled in the art, and this invention, therefore, is intended to be limited only by the scope of the appended claims and the prior art.

What is claimed is:

1. A pressure responsive control comprising: a switch actuating arm pivotally moveable between a switch-actuated and a reset position by a switch-actuated and a reset force respectively, a pressure responsive actuator for exerting a switch-actuating force on said arm in response to a pressure change, a loading spring acting on said arm at a first point thereon and adapted to resist movement of said arm into switch-actuated position, means for adjusting the resistive force exerted by said loading spring comprising a pivotally moveable adjusting lever carrying an abutment adapted to cooperate with said loading spring and a manually moveable multiple position cam for moving said lever, a reset member operated by said adjusting lever at a point on said lever further from the effective pivot of said lever than said abutment, said reset member applying a reset force to said arm at a point between said first point and its effective pivot as said cam is manually moved from one to another of its multiple positions.

2. A pressure responsive control comprising a cup-shaped housing, a pressure responsive actuator mounted across the open face of said housing, a double-pole snap switch mounted within said housing including switch actuating arm pivotally moveable by said actuator from a switch-actuating to a reset position, a loading spring having one of its ends accessible from outside said housing and its other end bearing on said arm at a load point intermediate the ends of said arm, and an adjusting lever pivotally mounted exteriorly of said housing and carrying an abutment adapted to cooperate with said one end of the loading spring, and a cam cooperating with said lever and manually moveable from a first position to a second position to vary the force exerted by said load spring on said arm, a reset member operated by said adjusting lever at a point on said lever further from the effective pivot of said lever than said abutment, said reset member applying a reset force to said arm at a point between said first point and the effective pivot of said arm as said cam is moved between its first and second positions.

3. A pressure responsive control as claimed in claim 2 in which the said abutment is an adjustable calibrating screw.

References Cited in the file of this patent

UNITED STATES PATENTS

| 2,170,748 | Eaton | Aug. 22, 1939 |
| 2,390,145 | Graves | Dec. 4, 1945 |
| 2,595,967 | McCloy | May 6, 1952 |
| 2,636,093 | Clark et al. | Apr. 21, 1953 |